(12) United States Patent
Yaccarino et al.

(10) Patent No.: US 12,398,005 B1
(45) Date of Patent: Aug. 26, 2025

(54) CONTAINER LIFTING AND POURING TOOL

(71) Applicants: Kevin Yaccarino, Mays Landing, NJ (US); Lisa Yaccarino, Mays Landing, NJ (US)

(72) Inventors: Kevin Yaccarino, Mays Landing, NJ (US); Lisa Yaccarino, Mays Landing, NJ (US)

(*) Notice: Subject to any disclaimer, the term of this patent is extended or adjusted under 35 U.S.C. 154(b) by 905 days.

(21) Appl. No.: 17/569,985

(22) Filed: Jan. 6, 2022

Related U.S. Application Data

(60) Provisional application No. 63/142,758, filed on Jan. 28, 2021.

(51) Int. Cl.
*A47J 45/00* (2006.01)
*B65G 65/24* (2006.01)

(52) U.S. Cl.
CPC .................. *B65G 65/24* (2013.01)

(58) Field of Classification Search
CPC ....... B65G 65/24; B65D 25/2817; A47J 45/00
USPC ........................................................ 294/27.1
See application file for complete search history.

(56) References Cited

U.S. PATENT DOCUMENTS

| | | | | |
|---|---|---|---|---|
| 2,088,387 A * | 7/1937 | Rice, Jr. | ............. | A47G 23/0241 215/396 |
| D298,200 S * | 10/1988 | Block | ............................ | D7/622 |
| 5,013,075 A * | 5/1991 | Littell | .................. | B25J 15/0616 248/363 |
| D362,371 S * | 9/1995 | Williams | ....................... | D7/622 |
| 6,027,152 A | 2/2000 | Sawdey | | |
| 6,266,849 B1 * | 7/2001 | Petit | ......................... | B44D 3/14 220/759 |
| 6,588,064 B2 * | 7/2003 | Baum | ................ | A47G 23/0216 294/33 |
| D524,607 S * | 7/2006 | Kent-Fawkes | ................. | D7/622 |
| 7,207,538 B2 * | 4/2007 | Kent-Fawkes | ....... | B65D 23/106 220/741 |
| 7,387,323 B1 * | 6/2008 | Minnette | .................. | B44D 3/14 220/759 |
| 7,604,270 B1 * | 10/2009 | McCarthy | .......... | B65D 25/2832 220/759 |
| 8,011,622 B1 | 9/2011 | Guthrie | | |
| 8,870,252 B2 * | 10/2014 | Pratho | ................ | B65D 25/2817 294/34 |
| 9,211,760 B2 * | 12/2015 | Bajuyo | .................... | A45F 5/021 |
| D812,989 S * | 3/2018 | Seiders | ......................... | D7/622 |

(Continued)

*Primary Examiner* — Paul T Chin
(74) *Attorney, Agent, or Firm* — Bold IP, PLLC; Houda El-Jarrah

(57) ABSTRACT

A container lifting and pouring tool is described. The tool includes a top piece connected to a bottom piece by at least one connecting bar. The container lifting and pouring tool further includes a handle piece connected to the at least one connecting bar. A user grabs the handle of the tool and positions the bottom piece of the container lifting and pouring tool under a container. The user is able to pour out the contents of the container by holding the handle and optionally also holding a top or side or a handle of the container for additional support and tilting the container and pouring out the inner contents of the container. The tool as a supporting device to reduce the strain and weight of repeatedly pouring out contents of the container, including when the container is a bucket.

18 Claims, 6 Drawing Sheets

(56) References Cited

U.S. PATENT DOCUMENTS

| | | | |
|---|---|---|---|
| 11,628,680 B1* | 4/2023 | Milcheck | A47G 19/28 |
| | | | 269/309 |
| D1,012,398 S * | 1/2024 | Bergman | D32/53.1 |
| 2005/0263542 A1 | 12/2005 | Brezden | |
| 2013/0076053 A1 | 3/2013 | Mayes | |
| 2016/0052331 A1* | 2/2016 | Bajuyo | A45F 5/021 |
| | | | 294/27.1 |

* cited by examiner

CONTAINER LIFTING AND POURING TOOL

CROSS-REFERENCE TO RELATED APPLICATIONS

This application is a non-provisional application which claims priority to U.S. Provisional Patent Application No. 63/142,758 filed on Jan. 28, 2021, which is incorporated by reference in its entirety.

FIELD OF THE DISCLOSURE

The present invention relates to a lifting aid for lifting and pouring out the contents of a bucket or other similar container.

BACKGROUND

Buckets are frequently used for hauling and carrying various items, including dirt, rocks, mulch, or other items. Most buckets have a handle for carrying the bucket. However, it is still quite difficult to carry heavy buckets as the bucket tends to swing to one's side at an awkward angle. Many people experience back pain and other bodily aches and pains after carrying a heavy bucket and having to also pour out the contents of a bucket. When an individual has to repeatedly lift a heavy bucket and pour the contents out (for example when gardening or performing construction related work), it is common to experience great fatigue and pain in one's back, neck, and other parts of the body.

Accordingly, there is a need for a tool and an aid for lifting and pouring out the contents of a bucket or other similar container to assist in this process.

SUMMARY

The present description provides one or more non-limiting embodiments for a container lifting and pouring tool whereby the container lifting and pouring tool comprises a top piece, a bottom piece, one or more connecting bars, in which the top piece is connected to the bottom piece by the one or more connecting bars, and a handle coupled to the one or more connecting bars. In a non-limiting embodiment, a gap exists between a back surface of the one or more connecting bars and the handle and the handle extends outwardly and away from the back surface of the one or more connecting bars. In a non-limiting embodiment, the top piece has a curved profile and the bottom piece has a curved back edge and a straight front edge. Further, the handle is coupled to a lower end of the one or more connecting bars and to the back surface of the one or more connecting bars. In a non-limiting embodiment, the one or more connecting bars comprises a lower curved piece having a concave curvature, whereby the one or more connecting bars is angled at an obtuse angle away from the lower curved piece and whereby the bottom piece is angled upwardly away from the lower curved piece. In a non-limiting embodiment, the bottom piece is a half circular piece.

The present description further includes an exemplary method for using the container lifting and pouring tool. The method may include positioning a container lifting and pouring tool against one side of a container, whereby the container lifting and pouring tool comprises a top piece, one or more connecting bars, and a bottom piece, wherein the bottom piece is connected to the top piece by at least the one or more connecting bars, wherein the container lifting and pouring tool further comprises a handle, wherein the handle is attached to a back side of the one or more connecting bars. The method may further comprise positioning a bottom piece of the container lifting and pouring tool beneath a bottom surface of the container while holding the handle of the container lifting and pouring tool, wherein the top piece of the container lifting and pouring tool is substantially simultaneously contacting a side surface of the container. The next step may include gripping the handle of the container lifting and pouring tool while also gripping either a handle of the container or a side of the container and lifting the container with one hand and pouring out contents inside of the container while also holding the container support lifting and pouring tool to assist in tilting the container and pouring out the contents. The method may further include holding the handle of the container lifting and pouring tool while the container lifting and pouring tool is supporting the container and while the container is fully turned over to fully empty the contents of the container.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to a tool and aid for lifting containers, including but not limited to, buckets or any other type of container. Further, the support tool as described herein may help to also pour out the contents of the container as the container faces downwards. Many people who must continuously lift a heavy bucket or other type of container and pour out its contents understand how tiring this act can be, especially when performed continuously and repeatedly. The repetitive motion of pouring out a bucket, including when a user has to continuously fill and empty the container, puts a great deal of strain on the user's muscles to pick up a container and transport it to an intended location and pour out the contents inside of the container onto a ground or other type of surface.

Many individuals can suffer from bodily pain and body aches after lifting a heavy bucket or other container either once or multiple times. For example, anyone who works in construction, contracting, and gardening or landscaping, without limitation to these fields, where contents need to be regularly carried and poured out of buckets or other containers understand that this can be a very tiring process. Accordingly, it would be beneficial to have a portable tool to help the user lift and pour out the contents of containers to reduce the strain on one's body when lifting the container and effort required by a user.

Accordingly, the present description includes embodiments for a container lifting and pouring support tool. The container lifting and pouring support tool may be in the form of a single tool having integrated parts that cooperate to hold the container in a way that is more ergonomic and comfortable for the user. More details are provided below in the description in reference to the accompanying Figures.

Figure 1:
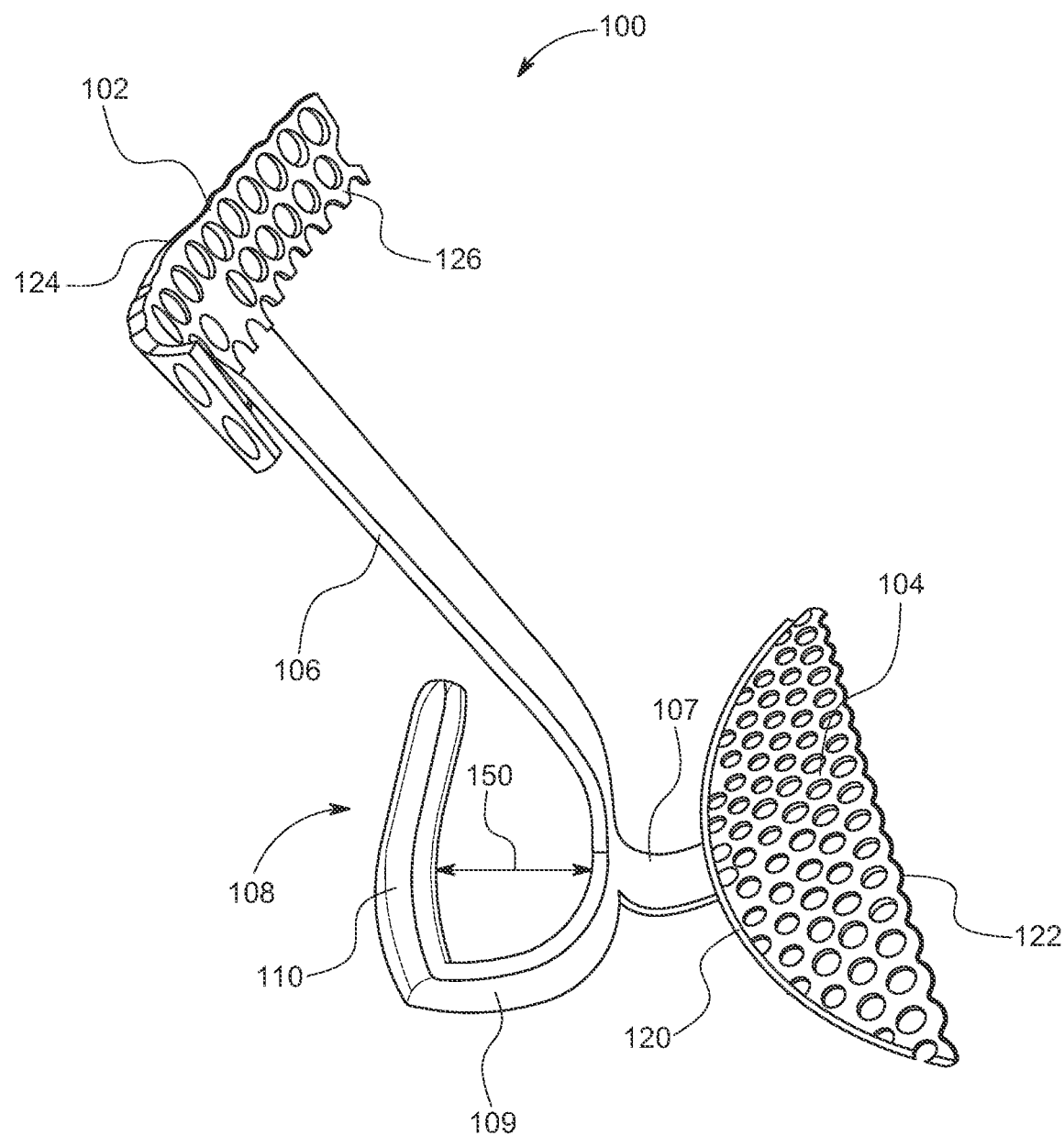
FIG. 1 is a pictorial illustration of a perspective side view of a container lifting and pouring tool.

FIG. 1 shows a perspective side view of the container lifting and pouring support tool 100. The container lifting and pouring support tool 100 may further be referred to herein as "a container support tool," "a tool," "a container lifting tool," "a lifting and pouring aid," or "a lifting aid."

Figure 2:
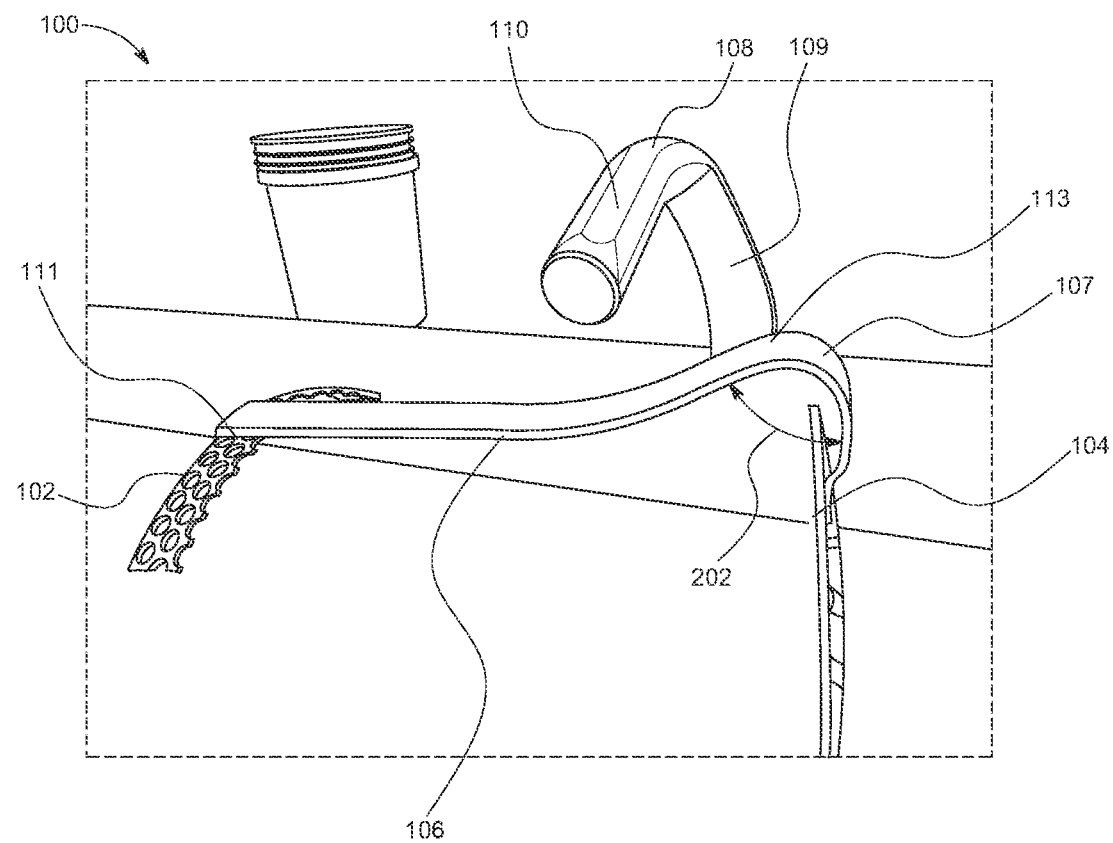
FIG. 2 is a pictorial illustration of a back view of a container lifting and pouring tool.
Figure 3A:
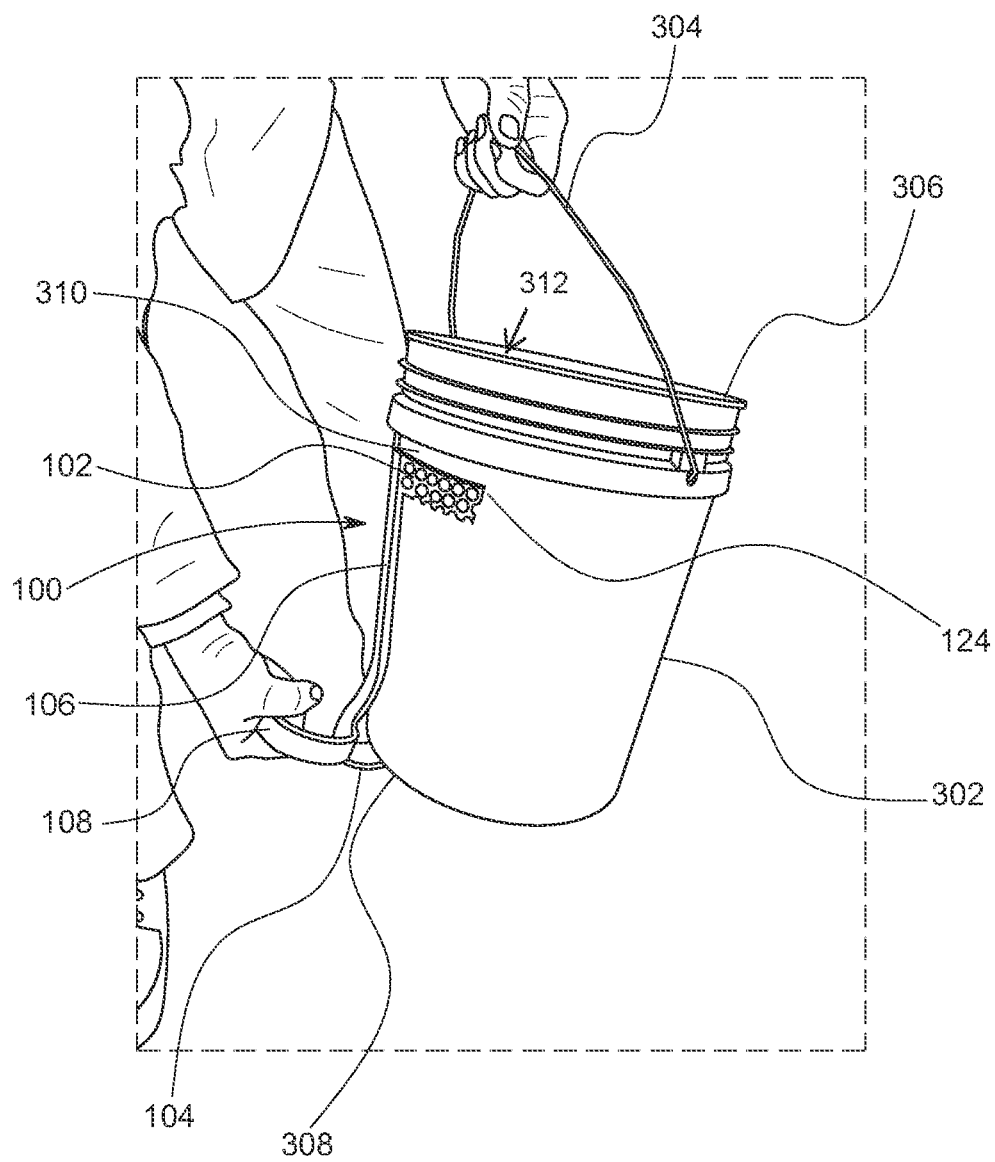
FIG. 3A is a pictorial illustration of a container lifting and pouring tool positioned and pushed up against a side of a container and beginning to lift a container.
Figure 3B:
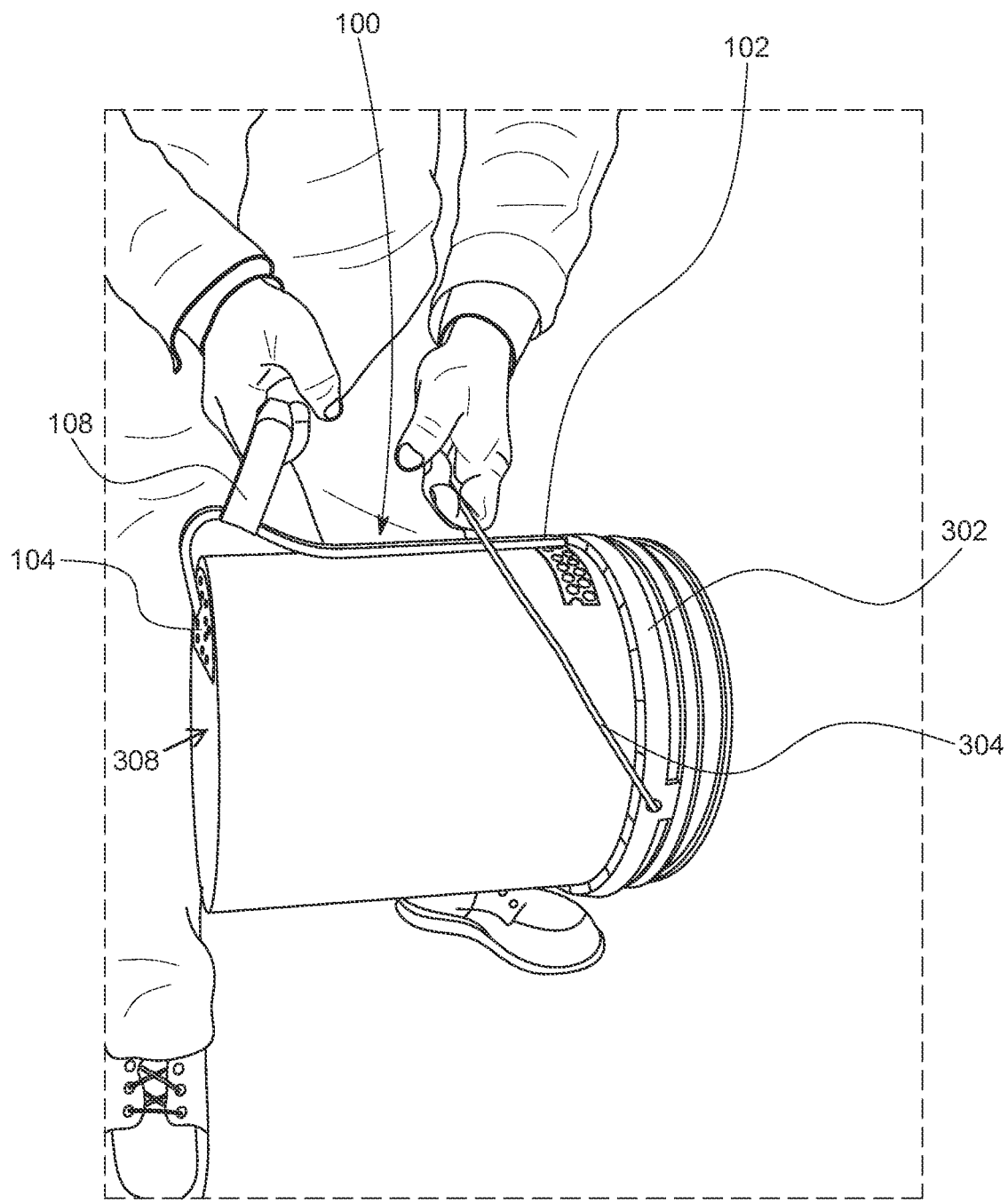
FIG. 3B is a pictorial illustration of a container lifting and pouring tool positioned against the side of a container while the user is in the process of lifting and pouring out the contents of the container.
Figure 3C:
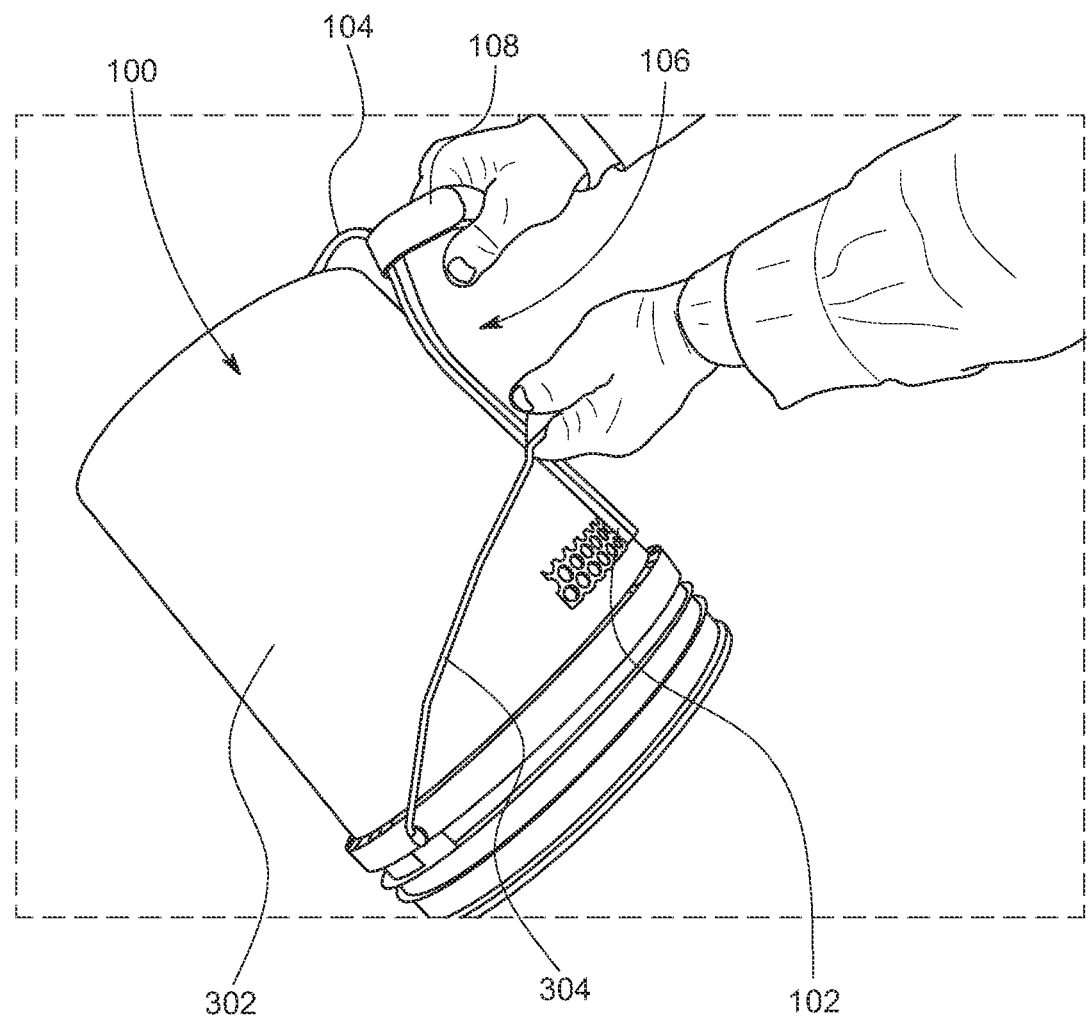
FIG. 3C is a pictorial illustration of a container lifting and pouring tool with a container and the container being tilted downwards to pour out its contents.

The container lifting and pouring support tool 100 is a tool that is separate from a container. Using the container lifting and pouring support tool 100, a user can place and correctly position the container lifting and pouring support tool 100 against and under a container 302 (as shown in FIGS. 3A-3C) or another type of container in order to support the user as the user lifts the container and pours out its contents. FIG. 2 shows a view of the container support tool 100 turned over on its side.

While the Figures herein show the container support tool 100 being used to lift and pour out contents of a bucket, it is to be understood that the container support tool 100 is not limited in use and application solely to buckets. The container support tool 100 may be used as an aid to help lift, support, and pour out the contents of any type of container, including without limitation, buckets, boxes, bins, tubs, or any other type of container.

Further, in one non-limiting embodiment, the container support tool 100 may be a portable tool separate from a container and may be used as needed with a same or different container. In other non-limiting embodiments, the container support tool 100 may be integrated with and be attached to and act as a part of a container, such that the container when manufactured includes a container support tool 100 attached to the container that functions in accordance with the container support tool 100 as described herein. The container support tool 100 is intended to be useful to reduce the stress and strain on the user when picking up and pouring out contents in the corresponding container.

As shown in FIGS. 1-2, the container support tool 100 may include a top piece 102 and a bottom piece 104. The top piece 102 and the bottom piece 104 may be joined or connected together by at least one connecting bar 106. The container support tool 100 as shown in the Figures may include only a single connecting bar 106, but in other embodiments, there may be more than one connecting bar 106 connecting the top piece 102 to the bottom piece 104. Accordingly, there may be one, two, three, or more connecting bars 106 connecting the top piece 102 to the bottom piece 104.

The container support tool 100 may further include a handle, such as handle 108 shown in FIGS. 1-2. The at least one connecting bar 106 may connect the top piece 102, bottom piece 104, and handle 108 together with the various components attached to various points of the connecting bar 106.

The components of the container support tool 100 may have a unique form and design in order to ensure that the container support tool 100 may conform to the shape of a side of a bucket 302 (e.g., as shown in FIGS. 3A-3C) or another container.

In a non-limiting embodiment, the top piece 102 may have a curved profile as shown in FIGS. 1-2. Accordingly, the top edge 124 and bottom edge 126 of the top piece 102 may be curved as is the body of the top piece 102. The top piece 102 may generally curve inwardly and have a concave shape in a non-limiting embodiment. Alternatively, the top piece 102 may have a straight profile such that the top edge 124 and the bottom edge 126 of the top piece 102 are straight and do not curve. Notably, it may be preferable that the shape of the body of the top piece 102 curves inwardly so as to press against and fit a side of a container 302 (e.g., as shown in FIG. 3A). If the container 302 has a curved profile, such as the bucket 302 shown in FIGS. 3A-3C, which has rounded side surfaces 310, the top piece 102 may also have a curved profile, and curve inwards in particular, in order to fit against the curved outer side of the bucket 302. But, if the container has a straight outer side or some other configuration, such as may be the case with a box or bin or tub, the top piece 102 may be manufactured or designed to have a corresponding shape and form to fit against the side of such a container and may have a straight profile. Accordingly, the top piece 102 may conform to and fit a side surface 310 of a container 302. In one non-limiting embodiment, the top piece 102 of the container lifting and pouring tool 100 may have a curve to fit against a rounded side or profile of the container 302. In one non-limiting embodiment, the top piece 102 may have a straight front surface 126 and straight back surface 124 that is configured to press against and is contact with a straight side of a container 302, such as when the container is a box or tub or bin having straight sides whereby the box or tub or bin may be a rectangle or square shape.

The top piece 102 may be attached to the connecting bar 106 as shown in FIGS. 1-2. In a non-limiting embodiment, the connecting bar 106 may generally connect to a back surface 111 of the top piece 102. In an exemplary non-limiting embodiment, the connecting bar 106 may connect to a central portion of the back surface 111 of the top piece 102 as shown in FIG. 2. In other embodiments, the connecting bar 106 may connect to a front surface of the top piece 104 or a side surface or any other arrangement.

The connecting bar 106 acts as a vertical support rod or bar for the container support tool 100 that connects the top piece 102 to the bottom piece 104 and to the handle 108. A portion of the connecting bar 106 may be straight and then may begin to curve once the connecting bar 106 extends beyond the handle 108 as shown in FIG. 2 at point 113 where the curve for the connecting bar 108 begins to occur. Further, the connecting bar 106 may include a curved lower portion 107 that joins with the bottom piece 104 as shown in FIGS. 1-2.

In a non-limiting embodiment, the bottom piece 104 may have a curved back side 120 and a straight front side 122 as shown in FIG. 1. The bottom piece 104 of the container support tool 100 is adapted to cup or support an underside of a bucket (e.g., the underside 308 of bucket 302 as shown in FIG. 3A) or another container. While the embodiments shown in FIGS. 1-4 display the bottom piece 104 of the container support tool 100 as having a curved back side 120 and a straight front side 122, in other embodiments, both the back side 120 and the front side 122 may be straightened or curved as desired. Further, the bottom piece 104 may have a wider width and longer length in other embodiments.

When assembled, the connecting bar 106 includes a lower curved piece 107 that connects to both the curved handle portion 109 and to an underside of the bottom piece 104. In one or more non-limiting embodiments, the lower curved piece 107 may have a concave curve 202 as shown in FIG. 2. In other embodiments, the connecting bar 106 may join with the bottom piece 104 at a right angle, obtuse angle, or acute angle.

Further, in one or more non-limiting embodiments, the straight portion 110 of the handle 108 may be configured to rest on a ground surface or other surface while the bottom piece 104 is angled upwards. Accordingly, when the handle 108 is resting against a ground surface, the connecting bar 106 is angled backwards at an obtuse angle instead of straight up such that the top piece 102 is angled backwards and the bottom piece 104 is angled back as well as shown in FIG. 1. In other non-limiting embodiments, the connecting bar 106 may be straight and may be joined at a substantially right angle to the bottom piece 104.

The straight portion 110 of the handle 108 may be thicker and shaped like a bar or a cylinder to provide the user with a thick, sturdy, gripping piece that the user can grip comfortably when holding the container support tool 100 against the side 310 of the bucket 302 or other container (e.g., as shown in FIGS. 3A-3C). Further, the handle 108 protrudes and extends outwardly from a back of the connecting bar 106 and from the container support tool 100 as a whole. The straight portion 110 of the handle 108 may protrude from the back side of the container support tool 100 and connects to the curved portion 109 of the handle 108, as shown in FIGS. 1-2. In a non-limiting embodiment, there may be a gap or distance 150 between the handle 108 and the straight portion 110 of the handle 108 and the back side of the connecting bar 106.

In one or more non-limiting embodiments, the container support tool 100 may be formed and manufactured from or include a strong metal, such as steel, iron, or any other type of metal. Other types of materials may alternatively be used, including without limitation, plastic or wood or a combination of material types. Further, the container support tool 100 may be formed using injection molding in one or more non-limiting embodiments.

If the materials of the container support tool 100 are made of metal, the top piece 102 may be welded or soldered onto the top of the connecting bar 106 and the bottom piece 104 may also be welded or soldered to the bottom of the connecting bar 106 of the container support tool 100. The connecting bar 106 is basically attached to the top piece 102 and to the bottom piece 104 and to the handle 108 simultaneously.

Turning to FIGS. 3A-3C, FIGS. 3A-3C may display how the container support tool 100 may work with a container, such as container 302. Container 302, as shown in FIGS. 3A-3C is a bucket, which may be one type of container supported by the container support tool 100. The container 302, as shown in FIG. 3A includes a top surface 306, bottom surface 308, and side surface 310, as well as an interior cavity 312. The bottom surface 308 is a closed bottom surface while the top surface 306 defines the open cavity 312 through which any contents can be poured into or out of the container 302. In a non-limiting embodiment, the container 302 is a bucket 302 that has a cylindrical shape as is typical of most buckets and rounded sides. The container 302 may be used to contain any type of transportable contents. Such contents may include but are not limited to solid objects, such as rocks, tools, dirt, or any type of solid objects. Further, the container 302 may be used to transport liquids, including heavy liquids. As shown in FIG. 3A, the container 302 may include a container handle 304 that is normally used to grasp and hold the container 302 with one or two hands of the user.

As noted above, carrying a bucket or other type of container 302 can be an uncomfortable experience. When a bucket or other type of container 302 is full, it can be very heavy, which makes it difficult to not only carry but to tilt over to one side in order to pour out the contents of the bucket or other type of container 302. Advantageously, the container support tool 100 is an additional steadying, lifting, and pouring support tool that provides another way to securely hold, lift, tilt to one side, and pour out the contents of the bucket or other type of container 302. Further, the container support tool 100 may be beneficial and help in simply carrying the bucket 302 from one place to another because the user can hold the grip side of the handle 108 (e.g., the straight side 110 of the handle 108) in addition to container handle 304.

Positioning the container support tool 100 against a side of a bucket or container 302 includes holding the handle 108 of the container support tool 100 such that the bottom piece 104 is pressed up against an underside 308 of the bucket or container 302. The container support tool 100 is pressed up against any side of the bucket or container 302 such that the connecting bar 106 is pressed up closely against the side surface of the bucket or container 302 as shown in FIGS. 3A-3C. The bottom piece 104 of the container support tool 100 is also pressed up closely against the underside 308 of the bucket or container 302 as shown in FIGS. 3A-3C and is in close contact with the underside 308 of the bucket or container 302.

Further, the top piece 102 of the container support tool 100 is also pressed against the side surface 310 of the bucket or container 302 and makes contact with the side surface 310. Because the form of the top piece 102 of the container support tool 100 conforms to the form of the bucket or container 302, the top piece 102 fits securely against the side surface 310 of the bucket or container 302. As noted above and as shown in FIGS. 3A-3C, the top piece 102 may have a concave shaped body that curves inwards to accommodate the form and shape of the side surface of the bucket or container 302.

In a non-limiting embodiment, the container support tool 100 is removable and is not attached to the bucket or container 302. Accordingly, the container support tool 100 can be positioned as a whole single unit to support the container 302 and removed as a whole, single unit when no longer needed.

When positioned against the side surface 310 of the bucket or container 302, the top side 124 of the top piece 102 may terminate or stop just below the top surface 306 of the bucket or container 302 as shown in FIG. 3A. The size and dimensions of the container support tool 100 may be made to accommodate multiple sized buckets 302 or bins or any other types of containers. In a non-limiting embodiment, the top piece 102 may be approximately 6.5 inches wide, while the total length of the connecting bar is approximately 10.5 inches, and the bottom piece 104 may be approximately 8.5 inches wide. It is of course to be understood that these dimensions are purely exemplary and are non-limiting.

Further, in a non-limiting embodiment, the container lifting and pouring tool 100 may be adapted to work with 3.5-5-gallon buckets.

FIG. 3B shows that the user may optionally grasp the container handle 304 with one hand while also gripping the handle 108 of the container support tool 100 with the other hand while the container support tool 100 is in position such that the top piece 102 is resting against a side surface 310 of the bucket or the other container 302 and the bottom piece 104 is pressing up against an underside 308 of the bucket or container 302. Alternatively, the user may optionally grip a side surface (e.g., side surface 310 of the container 302) simultaneously while holding the handle 108 of the container support tool 100. Further, the user may not need to hold the container 302 at all and solely hold the handle 108 of the container support tool 100 which is securely positioned in place and holding the container 302. The user may lift the bucket or another type of container 302 in such a manner and tilt the bucket or the other container 302 to one side in order to either partially or fully pour out its contents. Further, as shown in FIG. 3C, the container support tool 100 provides a sturdy, support tool that allows the user to fully tilt the bucket or container 302 over and facing the ground in order to fully pour out its contents. Sometimes when a bucket or container 302 is too heavy, the user is unable to fully pick it up and pour out its contents. Rather, the user has to partially tilt the bucket or container 302 to pour out some contents or set it on the ground and push it over to the side to empty the contents before being able to pick up the bucket or container 302 and fully turn it over on its side to pour out its contents.

Figure 4:
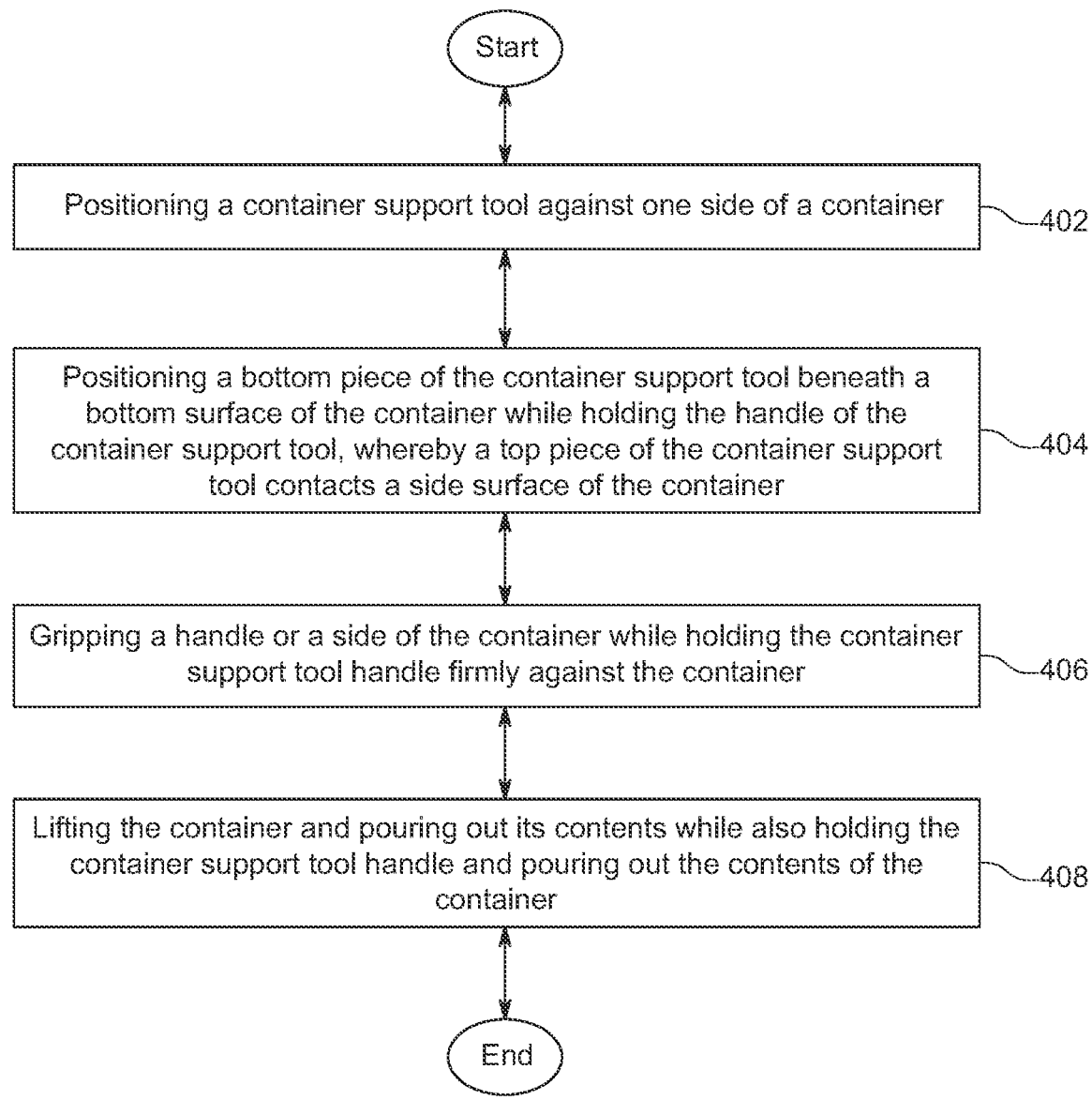
FIG. 4 is a flowchart of an exemplary method of use for using a container lifting and pouring tool.

FIG. 4 is a flowchart for an exemplary method for using the container support tool 100 as described above in FIGS. 1-3C. At step 402, in FIG. 4, the container support tool 100 may be positioned against a side surface 310 of the container 302. The positioning of the container support tool 100 against the side surface 310 of the container 302 may further include positioning a bottom piece 104 of the container support tool 100 beneath a bottom surface 308 of the container 302 while holding the handle 108 of the container support tool 100, whereby at such a position, the top piece 102 is contacting the side surface 310 of the container 100 as well as the connecting bar 106 which extends between the top piece 102 and the bottom piece 104 of the container support tool 100 as shown at step 404. At step 406, the user may grip the bucket handle 304 or a top side of a container 302 while holding the container support tool 100. At step 408, the container 302 can be lifted by the user who is holding the bucket handle 302 and also gripping the handle 108 to tilt and turn over the container 302 in a downwards direction in order to partially or fully pour out the contents of the container 302.

The top piece 102 and bottom piece 104 as shown in FIGS. 1-4 include holes throughout the body of the top piece 102 and bottom piece 104. These holes may be included in one or more embodiments or may be omitted in other embodiments and are not meant to be limiting as to the form and appearance of the top piece 102 and the bottom piece 104. Accordingly, the top piece 102 and/or bottom piece 104 may be a solid structure without any holes in their bodies or may include holes of any shape to potentially make the container support tool 100 lighter if needed.

As clearly shown in FIGS. 1-4, the container support tool 100 is very beneficial to support a user in carrying and pouring out contents within a container 100. In some embodiments, the container support tool 100 is a separate tool that can be used for any container. Accordingly, the container support tool 100 may be removable and portable and may be used with a myriad of containers.

In other embodiments, a container support tool 100 can be built into and integrated with a container and may not be removable. In such an embodiment, the container support tool 100 may function in accordance with the description provided above, such that the top piece 102 is attached to a side surface (e.g., 310 as shown in FIG. 3A of the container 302) and the bottom piece 104 is connected to a bottom surface 308 of the container 302. Further, the handle 108 protrudes away from the back surface of the connecting bar 106 and is grabbable by a user in order to pick up a container 302 and pour out the contents inside of the container 302. In such a container whereby the container support tool 100 is permanently attached, the user would not remove the container support tool 100 from the container upon completion of use.

The present description shows many advantages offered by the container support tool 100, which may serve as a lifting and pouring aid to pouring out any contents inside of a container such as rocks, cements, dirt, fluids, or any type of contents. The container support tool 100 may be easily stowed or carried where needed and may be used with a variety of containers 302. The container support tool 100 may be lightweight, versatile, and easy to use. One of ordinary skill in the art may understand that many more benefits and advantages may be provided by the bucket support tool 100 as described herein.

References in the singular tense include the plural, and vice versa, unless otherwise noted. The term "set" as used herein may refer to one or more items. The term "coupled to" as used herein may refer to items connected via direct or indirect means. Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An apparatus, comprising:
   a container lifting and pouring tool, comprising:
      a top piece;
      a bottom piece:
      at least one connecting bar, in which the top piece is connected to the bottom piece by the at least one connecting bar; and
      a handle coupled to the at least one connecting bar, and wherein the handle extends outwardly and away from a back surface of the at least one connecting bar
      wherein the at least one connecting bar is angled at an obtuse angle away from the bottom piece,
      wherein the handle comprises a straight bar coupled to a curved piece, wherein the curved piece of the handle connects the straight bar of the handle to the back surface of the at least one connecting bar, wherein a gap exists between the straight bar of the handle and the back surface of the at least connecting bar, and
      wherein the handle is not connected to the top piece.

2. The apparatus of claim 1, wherein the top piece has a curved profile.

3. The apparatus of claim 1, wherein the bottom piece has a curved back edge and a straight front edge.

4. The apparatus of claim 1, wherein the handle is coupled to a lower end of the at least one connecting bar and to the back surface of the at least one connecting bar.

5. The apparatus of claim 1, wherein the at least one connecting bar comprises a lower curved piece having a concave curvature.

6. The apparatus of claim 5, wherein the at least one connecting bar is angled at an obtuse angle away from the lower curved piece.

7. The apparatus of claim 5, wherein the bottom piece is angled upwardly away from the lower curved piece.

8. The apparatus of claim 1, wherein the bottom piece is a half circular piece.

9. A method for using a container lifting and pouring tool, comprising:
   positioning a container lifting and pouring tool against one side of a container, wherein the container lifting and pouring tool comprises a top piece, at least one connecting bar, and a bottom piece, wherein the bottom piece is connected to the top piece by at least the at least one connecting bar, wherein the container lifting and pouring tool further comprises a handle, wherein the handle is attached to a back side of the at least one connecting bar, further comprising:
   positioning a bottom piece of the container lifting and pouring tool beneath a bottom surface of the container while holding the handle of the container lifting and pouring tool, wherein the top piece of the container lifting and pouring tool is substantially simultaneously contacting a side surface of the container;
   gripping the handle of the container lifting and pouring tool while also gripping a container handle;
   lifting the container with one hand and pouring out contents inside of the container while also holding the container lifting and pouring tool to assist in tilting the container and pouring out the contents, and
   holding the handle of the container lifting and pouring tool while the container lifting and pouring tool is supporting the container and while the container is fully turned over to fully empty the contents of the container.

10. The method of claim 9, wherein the container has an open cavity defined by one or more side surfaces connected to a closed bottom surface.

11. The method of claim 9, wherein the container is a bucket.

12. The method of claim 9, wherein the top piece conforms to the side of the container and has a same profile as the side surface of the container, wherein the same profile comprises a curve or a straight surface.

13. The method of claim 9, wherein the container lifting and pouring tool is removable and portable.

14. The method of claim 9, wherein the container lifting and pouring tool is attached to a side surface of the container and is not removable.

15. The method of claim 9, wherein a gap exists between the back surface of the at least one connecting bar and the handle, and wherein the handle extends outwardly and away from the back surface of the one or more connecting bars.

16. The method of claim 9, wherein the handle is coupled to a lower end of the at least one connecting bar.

17. The method of claim 9, wherein the at least one connecting bar comprises a lower curved piece having a concave curvature.

18. The method of claim 17, wherein the at least one connecting bar is angled at an obtuse angle away from the lower curved piece.

\* \* \* \* \*